June 3, 1924.

J. A. KNOWLTON

HYDRAULIC MOTOR

Filed Sept. 5, 1922    6 Sheets-Sheet 1

1,496,470

Inventor:
John A. Knowlton,
by Walter E. Lombard,
Atty.

June 3, 1924.

J. A. KNOWLTON

HYDRAULIC MOTOR

Filed Sept. 5, 1922

Inventor:
John A. Knowlton,
by Walter E. Lombard,
Atty.

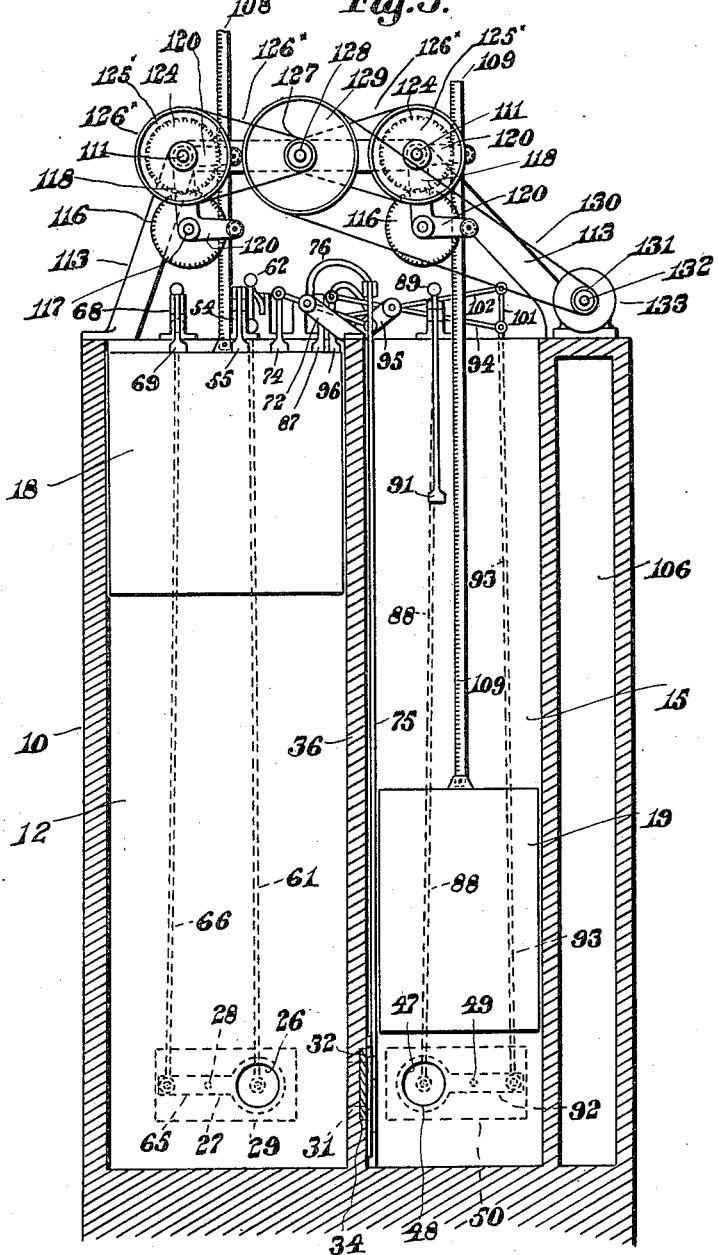

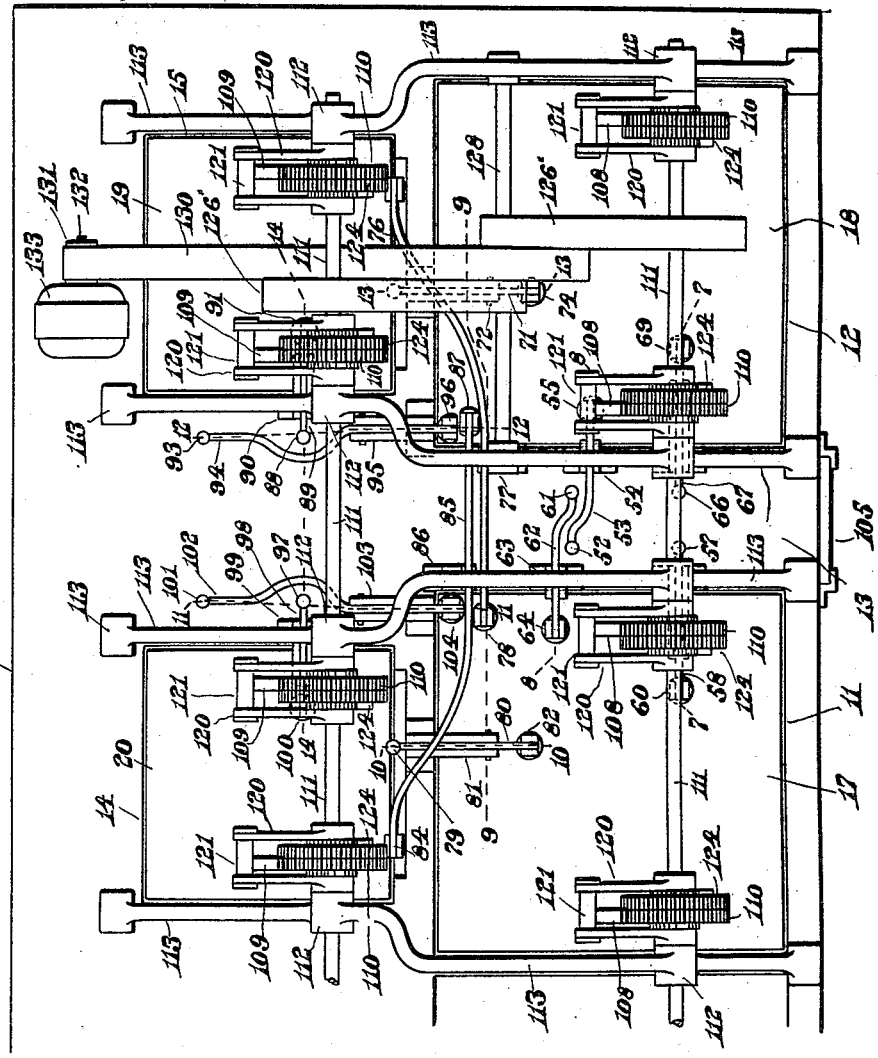

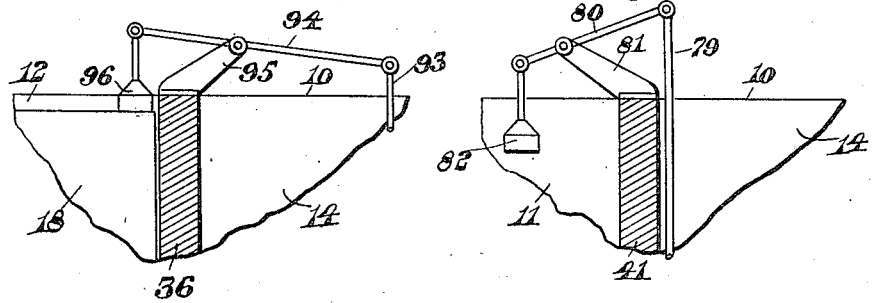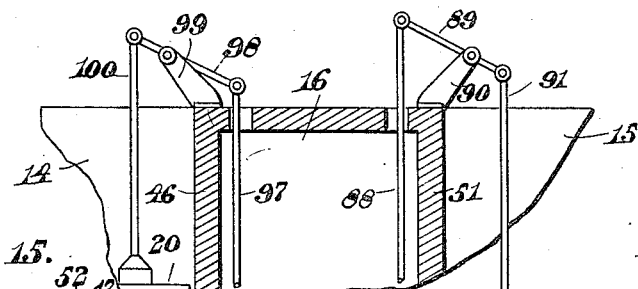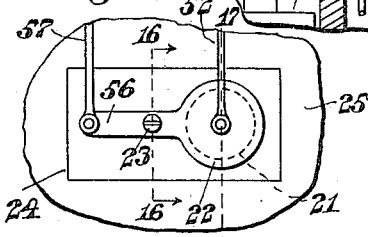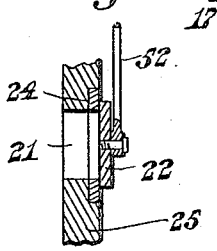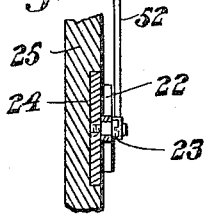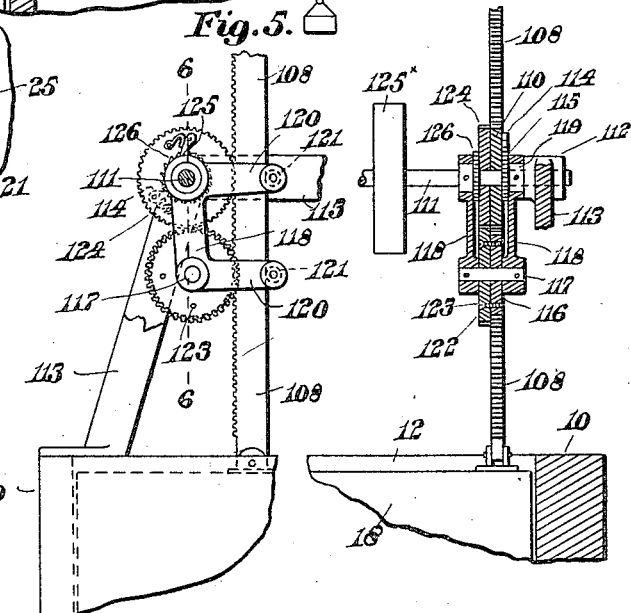

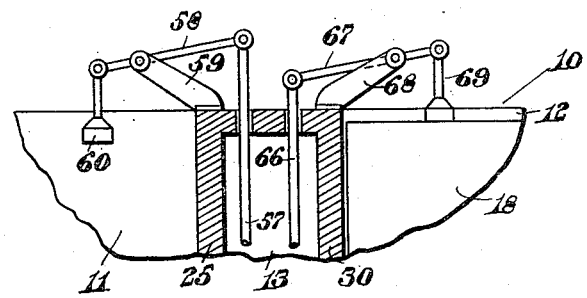
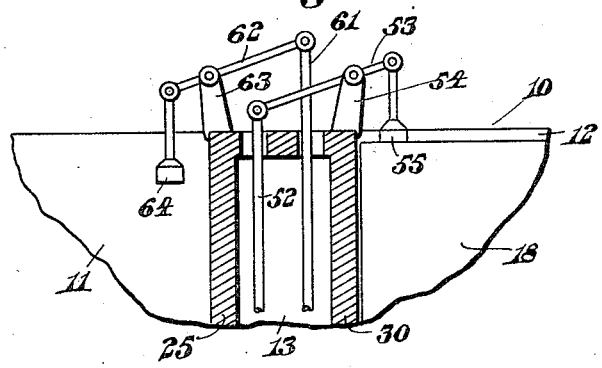
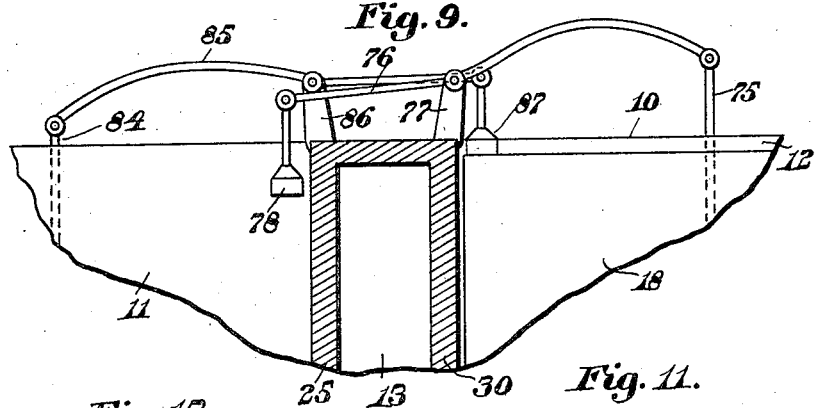
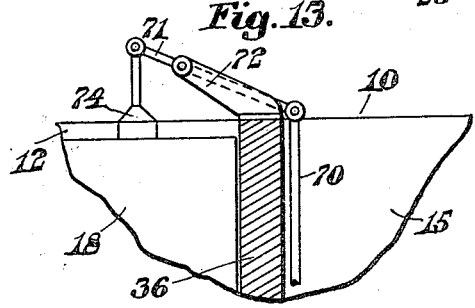
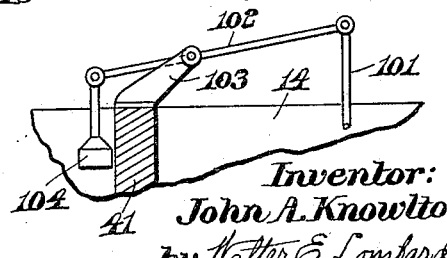

Patented June 3, 1924.

1,496,470

UNITED STATES PATENT OFFICE.

JOHN A. KNOWLTON, OF DORCHESTER, MASSACHUSETTS.

HYDRAULIC MOTOR.

Application filed September 5, 1922. Serial No. 586,090.

*To all whom it may concern:*

Be it known that I, JOHN A. KNOWLTON, a citizen of the United States of America, and a resident of Dorchester, in the county of Suffolk and State of Massachusetts, have invented certain new and useful Improvements in Hydraulic Motors, of which the following is a specification.

This invention relates to tide motors and is an improvement upon the invention set forth in U. S. Patent No. 1,209,975 issued to me December 26, 1916.

The object of the present invention is the production of an apparatus actuated by the tides for operating an electric generator, from which electric power may be conveyed to any desired point.

The invention consists of an electric generator and a plurality of floats in wells into which water may be admitted and expelled as desired, causing the floats to be raised and lowered, and thereby through suitable mechanisms actuate said generator.

The invention further consists of certain novel features of construction and arrangement of parts which will be understood readily by reference to the description of the drawings and to the claims to be hereinafter given.

For the purpose of illustrating the invention, one preferred form thereof is shown in the drawings, this form having been found to give satisfactory and reliable results, although it is to be understood that the various instrumentalities of which the invention consists can be variously arranged and organized, and that the invention is not limited to the precise arrangement and organization of the instrumentalities as herein shown and described, except as required by the scope of the appended claims.

Of the drawings:

Figure 3 represents a transverse vertical section on line 3, 3 on Fig. 1.

Figure 4 represents a plan of one-half of said apparatus drawn to an enlarged scale.

Figure 5 represents a detail view on enlarged scale showing the power transmission mechanism.

Figure 6 represents a section of the same on line 6, 6 on Fig. 5.

Figure 7 represents a vertical sectional detail on line 7, 7 on Fig. 4.

Figure 8 represents a vertical sectional detail on line 8, 8 on Fig. 4.

Figure 9 represents a vertical sectional detail on line 9, 9 on Fig. 4.

Figure 10 represents a vertical sectional detail on line 10, 10 on Fig. 4.

Figure 11 represents a vertical sectional detail on line 11, 11 on Fig. 4.

Figure 12 represents a vertical sectional detail on line 12, 12 on Fig. 4.

Figure 13 represents a vertical sectional detail on line 13, 13 on Fig. 4.

Figure 14 represents a vertical sectional detail on line 14, 14 on Fig. 4.

Figure 15 represents an elevation of one of the gates for closing the communicating opening in a partition wall, showing the rods for opening and closing said gate.

Figure 16 represents a vertical section of the same on line 16, 16 on Figure 15, and Figure 17 represents a vertical section on line 17, 17 on Fig. 15.

Similar characters indicate like parts throughout the several figures of the drawings.

Figure 1:
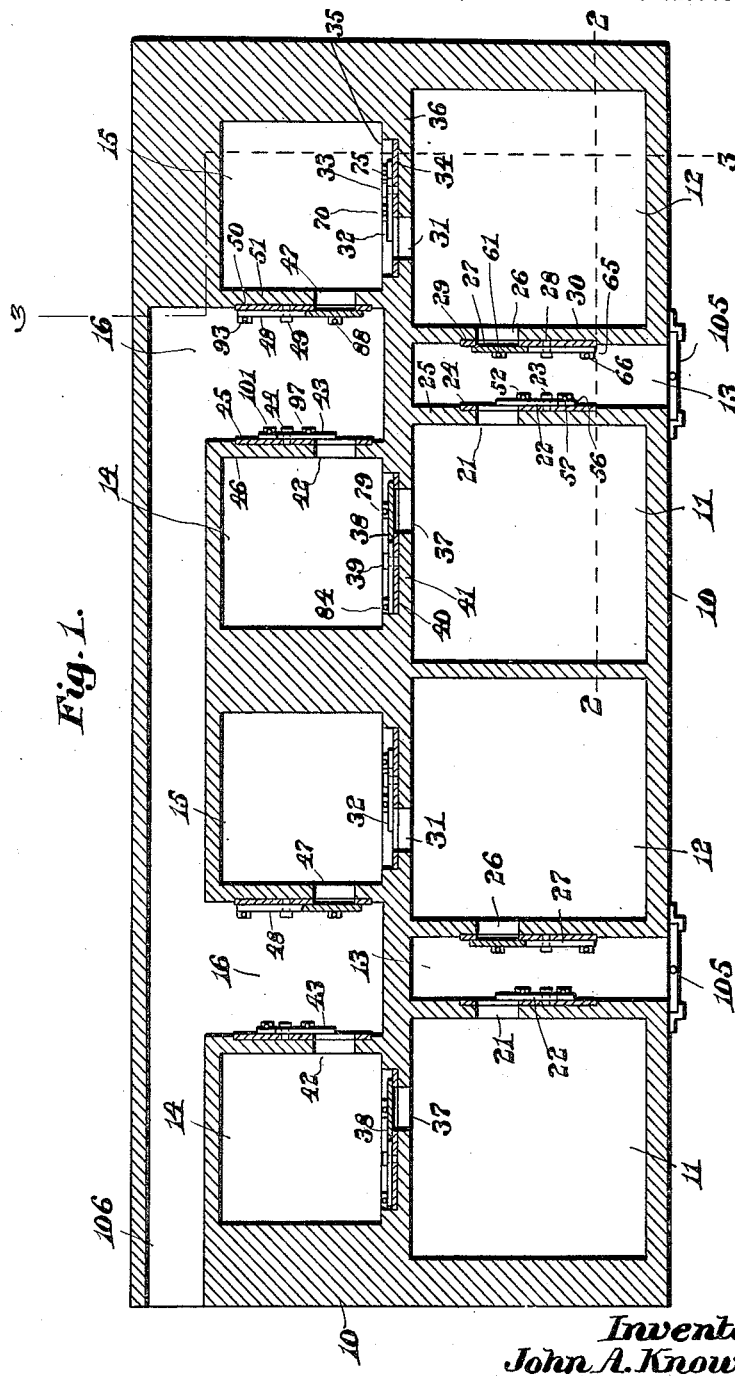
Figure 1 represents a horizontal section of an apparatus embodying the principles of the present invention.
Figure 2:
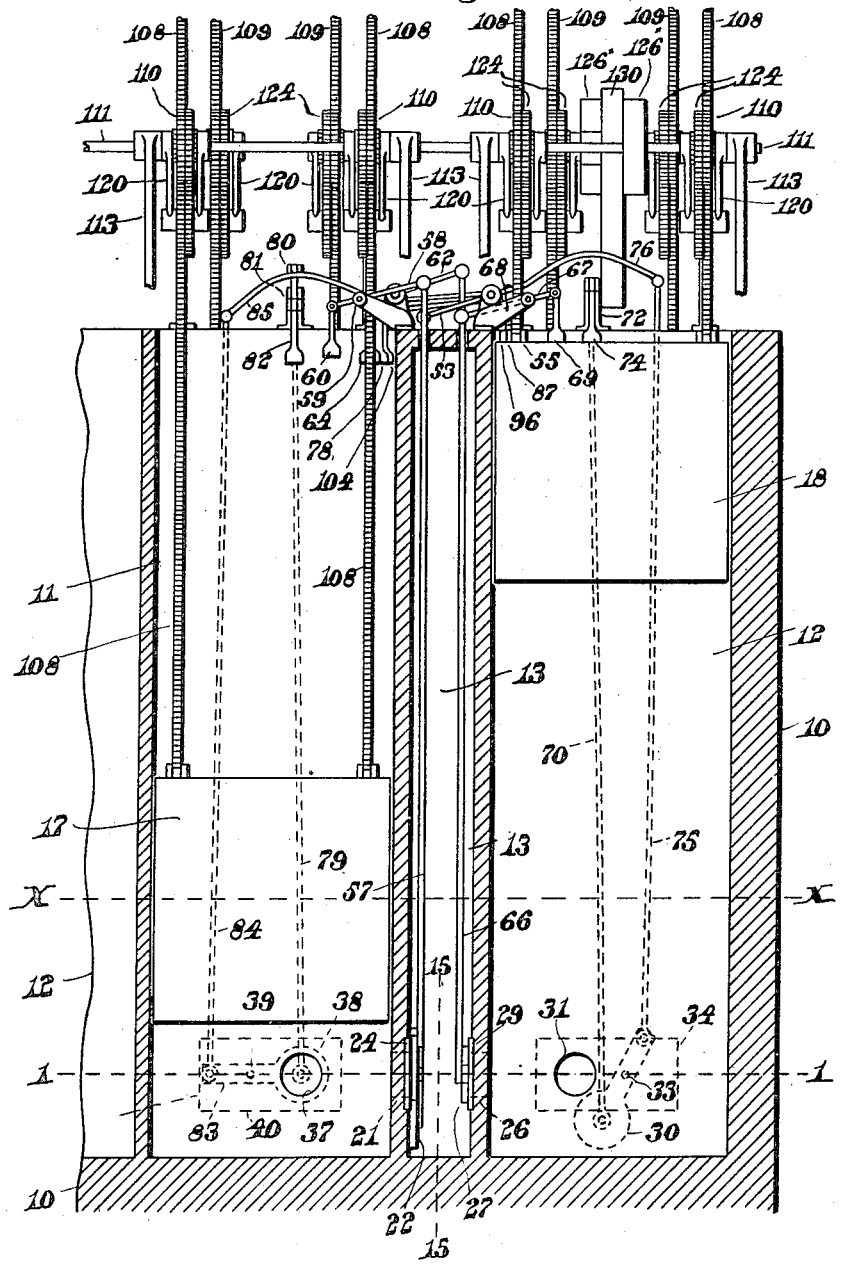
Figure 2 represents a vertical section on line 2, 2 on Fig. 1.

In the drawings, 10 indicates a wall structure of cement or some similar material set in the water, and having its base below the low water level indicated by the line $x, x$.

The structure is so constructed as to have formed therein a plurality of units, each unit consisting in part of two large wells or pits 11, 12, separated by a passage 13. At the rear of the wells 11, 12 are smaller wells 14, 15 separated by a passage 16.

In the well or pit 11 is a float 17 and in the well or pit 12 is a similar float 18.

In the well 15 is a float 19, while in the well or pit 14 is a similar float 20.

The bottom of the well or pit 11 communicates with the passage 13 through an opening 21 adapted to be closed by a gate 22 pivoted at 23 to a metal plate 24 set into the outer face of the wall 25 between said well 11 and the passage 13.

The bottom of the well 12, in a similar manner, communicates with the passage 13 by means of an opening 26 adapted to be closed by a gate 27 pivoted at 28 to a plate 29 set into the outer face of the wall 30, between the passage 13 and the well 12.

The bottom of the well 12 communicates with the bottom of the well 15 through an opening 31 adapted to be closed by a gate 32 pivoted at 33 to a plate 34 set into a recess 35 in the rear face of the wall 36 between the wells 12 and 15.

The bottom of the well 11 communicates with the bottom of the well 14 through an opening 37 adapted to be closed by a gate 38 pivoted at 39 to a plate 40, set into a recess in the rear face of the wall 41 between the wells 11 and 14.

The bottom of the well 14 communicates with the passage 16 through an opening 42 adapted to be closed by a gate 43 pivoted at 44 to a plate 45 set into the outer face of the wall 46 of the well 14.

In a similar manner, the bottom of the well 15 communicates through an opening 47 with the passage 16, said opening being adapted to be closed by a gate 48 pivoted at 49 to a plate 50 set into the outer face of the wall 51 between said well 15 and passage 16.

One end of the gate 22 has a rod 52 pivotally connected thereto, the upper end of which is connected to a lever 53 pivoted at 54, the opposite end of which has pivotally connected thereto a depending member 55 in the path of the float 18.

When the float 18 reaches the upper part of the well 12, the upper face thereof will come into contact with the depending member 55 and raise the same, moving the lever 53 about its pivot 54, and, forcing the rod 52 downwardly, will move the gate 22 downwardly about its pivot 23 and uncover the opening 21.

The arm 56 of the gate 22 has pivotally connected to its upper end a rod 57, the upper end of which is pivotally connected to a lever 58, pivoted to a bracket 59 mounted upon the upper end of the structure 10. This lever 58 has pivotally secured to its opposite end a depending member 60 in the path of the float 17 in the well 11.

When the float 17 reaches the upper part of the well 11, the upper face thereof will come into contact with the depending member 60, raising the same, and, moving the lever 58 about its pivot, will force the rod 57 downwardly and thereby move the gate 22 about its pivot until the opening 21 is again closed by said gate 22.

The gate 27 has pivotally connected thereto a rod 61 extending upwardly with its upper end pivotally connected to a lever 62 pivoted to the support 63 on the upper end of the structure 10, the opposite end of said lever 62 having pivotally connected thereto the depending member 64 in the path of the float 17.

When the float 17 reaches the upper part of the well 11, the upper face of the float 17 will come into contact with the depending member 64 and move the lever 62 about its pivot, forcing the rod 61 downwardly and causing the gate 27 to be moved downwardly about its pivot 28, thereby uncovering the opening 26.

The arm 65 of the gate 27 has pivotally secured to the outer end thereof a rod 66, the upper end of which is pivotally connected to a lever 67, pivotally mounted upon the bracket 68 at the upper end of the structure 10, the opposite end having pivotally secured thereto a depending member 69 in the path of the float 18.

When the float 18 reaches the upper end of the well 12, the upper face of said float will come into contact with the depending member 69 and move it upwardly, causing the lever 67 to be moved about its pivot, forcing the rod 66 downwardly, thereby moving the gate 27 about its pivot 28 to cause said gate to close the opening 26.

One end of the gate 32 has pivotally connected thereto a rod 70, the upper end of which is pivoted to the lever 71, said lever being pivoted at 72 to a bracket 73 on the upper end of the structure 10. The upper end of the lever 71 has pivoted thereto a depending member 74 in the path of the float 18.

When the float 18 reaches the upper part of the well 12, the upper face thereof will come into contact with the depending member 74 and raise the same, moving the lever 71 about its pivot and forcing the rod 70 downwardly, thereby moving the gate 32 about its pivot 33 and uncovering the opening 31.

The opposite end of the gate 32 has pivotally connected thereto a rod 75, the upper end of which is pivotally connected to the lever 76, pivoted to the bracket 77 and having pivotally connected to its opposite end a depending member 78 in the path of the float 17 in the well 11.

When the float 17 reaches the upper end of the well 11, the upper face of said float will come into contact with the depending member 78 and move it upwardly, thereby forcing the rod 75 downwardly to cause the gate 32 to be moved about its pivot 33 and again cover the opening 31.

The gate 40 has pivotally connected thereto a rod 79, the upper end of which is pivotally connected to a lever 80 pivoted to a bracket 81 secured to the upper face of the structure 10, the opposite end of this lever 80 having pivotally connected thereto a depending member 82 in the path of the float 17.

When the float 17 reaches the upper end of the well 11, the upper face of the float 17 will come into contact with the depending member 82, and lift the same, thereby moving the lever 80 about its pivot and forcing the rod 79 downwardly, thus moving the gate 40 about its pivot 39 and uncovering the opening 37.

The arm 83 of said gate 40 has pivotally connected to its outer end a rod 84, the upper end of which is pivotally connected to the lever 85, pivoted to a bracket 86 secured to the upper end of the structure 10. The opposite end of said lever 85 has pivotally connected thereto a depending member 87 in the path of the float 18 in the well 12.

When the float 18 reaches the upper end of the well 12, the upper face of said float 18 will come into contact with the depending member 87 and lift the same, moving the lever 85 about its pivot and forcing the rod 84 downwardly, thereby moving the gate 40 about its pivot 39 so that it will again close the opening 37.

The gate 48 has pivotally connected thereto a rod 88, the upper end of which is pivotally connected to a lever 89, pivoted to a bracket 90 on the upper end of the structure 10, said lever 89 having pivotally secured to its opposite end a depending member 91 in the path of the float 19 in the well 15.

When the float 19 reaches the upper end of the well 15, the upper face of said float will come into contact with the depending member 91 and lift the same, thereby moving the lever 89 about its pivot and forcing the rod 88 downwardly. This downward movement of the rod 88 will cause the gate 48 to be moved about its pivot 49 to uncover the opening 47.

The arm 92 of said gate 48 has pivotally connected to its outer end a rod 93, the upper end of which is pivotally connected to a lever 94, pivoted to a bracket 95 on the upper end of the structure 10, the opposite end of said lever 94 having pivotally connected thereto a depending member 96 in the path of the float 18 in the well 12.

When the float 18 reaches the upper end of the well 12, the upper face thereof will contact with the depending member 96, raising the same and thereby moving the lever 94 about its pivot and forcing the rod 93 downwardly. This downward movement of the rod 93 will move the gate 48 about its pivot 49 into a position to again cover the opening 47.

The gate 43 has pivotally connected thereto a rod 97, the upper end of which is pivotally connected to a lever 98 pivoted to a bracket 99 at the upper end of the structure 10, the opposite end of said lever 98 having pivotally connected thereto a depending member 100, in the path of the float 20 in the well 14.

When the float 20 reaches the upper end of the well 14, the upper face of said float will contact with the depending member 100 and lift the same, thereby moving the lever 98 about its pivot and forcing the rod 97 downwardly, thus causing the gate 43 to be moved about its pivot 44 into position to uncover the opening 42.

The gate 43 has also pivoted to its opposite end a rod 101, the upper end of which is pivotally connected to a lever 102 pivoted to a bracket 103, at the upper end of the structure 10, the opposite end of said lever 102 having pivotally connected thereto a depending member 104 in the path of the float 17 in the well 11.

When the float 17 reaches the upper end of the well 11, the upper face of said float will come into contact with the depending member 104, raising the same and causing the lever 102 to be moved about its pivot to force the rod 101 downwardly, thereby moving the gate 43 about its pivot 44 into a position to again close the opening 42.

Each unit of the system consists of the four wells 11, 12, 14 and 15, with the floats 17, 18, 20 and 19 respectively positioned therein, and the mechanisms herein described for operating the gates between the wells 11, 12 and the passage 13, the gates between the wells 14, 15 and the passage 16, and the gates between the wells 11 and 14, and 12 and 15 respectively.

The structure 10 may be provided with as many units as may be desired, each unit being the counterpart of the unit just described.

The operation of the floats 17 and 18 are so timed that one of these floats will be at the bottom of the well when the other is at the top of its well, and vice versa.

Likewise, the floats 18 and 19 are so timed that when one of these floats is at the top of its well, the other is at the bottom thereof, and vice versa, this being also true of the floats 17 and 20.

The entrance to each passage 13 is adapted to be closed by a gate 105 which may be of any well known construction.

This gate is adapted to be lifted to permit the water from the reservoir or river to enter the passage 13, and when the float 18 is in its lowermost position, the gate 27 of the well 12 will be opened to permit the water entering the passage 13 from the river to pass through the opening 26, thereby raising the float 18 in the well 12, it being understood that at this time the gate 32 is closed.

As soon as the float reaches the upper part of the well 12, it will close the gates 27, 48, and 38, and will open the gates 32 and 22.

As soon as the gate 27 is closed, further admission of the water through the passage 13 from the river is shut off from the well 12, but as the opening 21 is then uncovered by the gate 22, the water from the river will be diverted from the passage 13 into the well 11, and will commence to lift the float 17 therein, the gate 38 from the well 11 being at this time closed.

The gate 32 having been opened, the water in the well 12 will pass through the opening 31 into the well 15 and cause the float 19 therein to be raised, while the float 18 in the well 12 is falling.

When the float 18 in its falling and the float 19 in rising reach the same level, the gate 48 will be opened and the two floats 18 and 19 will move downwardly together.

When the float 19 reaches its uppermost position in the well 15, it will actuate the gate 48, uncovering the opening 47, and permit the water confined within the wells 12 and 15 to pass through the opening 47 into the passage 16 and through the outlet 106 into the spillway.

When the floats 18 and 19 have reached their lowest levels, the gate 27 will be opened and the gates 32 and 48 will be closed, this operation of the gates 27, 32 and 48 being effected by the floats 17 and 20 reaching their uppermost positions, as has been hereinbefore described.

When the float 17 reaches its uppermost position, it opens the gate 38, permitting the water in the well 11 to pass through the opening 37 into the well 14, the gate 43 being at this time closed.

Before the gate 27 is again opened, the float 17 in the well 11 reaches its uppermost position and closes the gate 22 and opens the gate 38, permitting the water in the well 11 to pass through the opening 37 into the well 14, thereby lifting the float 20 therein.

While the float 20 is moving upwardly, the float 17 is moving downwardly. When these two floats 17 and 20 reach the same level, the upward movement of the float 20 will actuate the gate 43, uncovering the passage 42 and thus permit the water in both wells 11 and 14 to pass outwardly through the passage 16 and the outlet 106 into the spillway.

It is obvious, therefore, that the main wells 11 and 12 of each unit are operating alternately, one of the admission gates of each of these wells being always open.

It is also self-evident that during a portion of the downward movement of each main float in the main wells 11 and 12, the companion smaller float 14 or 15 is being raised.

By means of this construction, the upward movement of each main float may be utilized to develop power, which development of power may be continued during a portion of the lowering of the main float by the upward movement of the companion smaller float.

Each main float 17 and 18 has pivotally connected to the upper end thereof a pair of rack members 108, and each companion smaller float 19 and 20 has pivotally secured to the upper end thereof a pair of rack members 109.

The racks 108 and 109 are each in mesh with a gear 110 loosely mounted on a shaft 111 carried in the journals 112 of a framework 113 on the top of the structure 10. When either float is being raised, the gear 110 is rotated and its motion is imparted to the shaft 111 through a pawl 114, mounted on the gear, which engages a tooth in the ratchet wheel 115 fixed on the shaft 111. This drives the shaft during the rise of the tide and permits the float to drop with the fall. In order that the energy of the falling weight may not be wasted, provision is made for utilizing the weight to aid in driving the shaft 111. This is done by providing a gear 116 in mesh with a rack 108 or 109 and rotatably mounted on a counter shaft 117. The counter shaft is supported at each end by a yoke 118 depending from the shaft 111. The upper ends of the yokes may surround the hubs 119 of the ratchet wheels if desired. The yokes have arms 120 which extend on each side of the rack members 108 and 109 and carry rolls 121 to retain the racks in engagement with the gears.

The gear 116 is rigidly connected with a larger gear 122 by screws 123 and this gear is in mesh with a gear 124 on the shaft 111. The gear 124 is connected to drive the shaft by a pawl 125 and a ratchet wheel 126 in exactly the same way as has been described with relation to the gear 110. By this construction, the downward movement of the rack members 108, 109 drives the gear 124 in the direction of the arrow on Fig. 5, and the motion is transmitted to the shaft by the ratchet and pawl. It is apparent that the direction of the rotation of the gears 110 and 124 is always opposite so that while one gear is driving the shaft, the other gear is running idly in the opposite direction with its pawl clicking over the ratchet teeth.

Each of the shafts 111 has secured thereto a pulley $125^x$ having a belt $126^x$ thereon, which transmits rotary movement from the shafts 111 to the sheave 127 secured to and revoluble with the shaft 128, revolubly mounted in the framework 113.

This shaft 128 has secured thereto and revoluble therewith a pulley 129 from which rotary movement is imparted by a belt 130 to a pulley 131 on the driving shaft 132 of an electric generator 133.

By means of this mechanism, continuous rotary movement is imparted to the shaft 128 and transmitted to the driving shaft 132 of the electric generator 133, thereby providing a means whereby the movements of the various floats will continuously actuate a generator to produce an electric current which may be transmitted to any convenient point.

While in the drawings, one form of mechanism for operating the various gates by the movement of the different floats is shown, it is quite obvious that any other suitable mechanism may be used in lieu thereof, provided the various gates are actuated at the times herein specified.

In the drawings, the gates 22, 32 and 43 are shown open and the gates 27, 38 and 48 are shown closed. When the gates are in these positions, the water from the river entering through the gate 105 into the passage 13 will flow through the opening 21 into the well 11 and lift the float 17 which is shown in is lowest position.

As soon as this float 17 reaches the upper end of the well 11, by its contact with the depending members 60, 64, 78, 82 and 104, the gates 27, 38 will be opened and the gates 22, 32 and 43 will be closed.

The water will then flow from the well 11 into the well 14 and raise the float 20 in said well 14 until it reaches its highest point, when, coming into contact with the depending member 100, and lifting the same, it will open the gate 43 and permit the water in the wells 11 and 14 to pass through the opening 42, the passage 16, and through the outlet 106.

In the meantime, the gate 27 having been opened and the gates 22 and 32 closed, the water flowing into the passage 13 will be diverted through the opening 26 into the well 12, and lift the float 18 therein until it reaches its upper position, at which time it will come into contact with the depending members 55, 69, 74, 87 and 96, lifting these depending members and causing the gates 22, 32 and 43 to be opened and the gates 38 and 43 to be closed.

The water in the passage 13 will then be admitted to the well 11 and the water in the well 12 will pass through the opening 31 into the well 15 and lift the float 19 therein until it reaches its upper position, at which time it will come into contact with the depending member 91 and by raising the same, open the gate 48, thereby permitting the water in the wells 12 and 15 to pass outwardly through the opening 47 through the passage 16 and the outlet 106.

It is obvious that by means of this system of wells, floats, and gate-operating mechanisms, a continuous flow of water is always passing through either of the wells 11 and 14 or the wells 12 and 15.

Consequently, at all times there are at least one or more of the floats in these wells being raised and producing through the rack members extending upwardly therefrom, a continuous rotation of the shaft 128, which drives the generator 133.

The gates 22, 27, 43 and 48, being located in the passages 13 and 16, are adapted to operate outside of the walls of these passages, but in order to prevent interference with the floats 20 and 19 in the wells 14 and 15, the gates 32 and 38 are mounted in deep recesses in the walls 36 and 41 as indicated in Fig. 1 of the drawings.

Having thus described my invention, I claim:

1. In an apparatus of the class described, a concrete structure having two wells, the adjacent walls of which are spaced apart to form a compartment for the inflow of water from a source of supply, each of said wells being provided with an inlet at its bottom communicating with said compartment and an outlet distinct from said inlet and located at the bottom of said well; a float in each well; gates in said inlets; means for admitting water under pressure to said compartment; gates in said outlets; means coacting with said floats for developing power by the movement thereof; and means disconnected from but operable by contact with the float in one well for simultaneously closing the inlet gate and opening the outlet gate in said well, and at the same time opening the inlet gate and closing the outlet gate in the other well.

2. In an apparatus of the class described, a concrete structure having two wells, the adjacent walls of which are spaced apart to form a compartment for the inflow of water from a source of supply, each of said wells being provided at the bottom thereof with an inlet to said compartment and an outlet therefrom distinct from said inlet; and means disconnected from the float in one well for positively closing its inlet and opening its outlet and simultaneously opening the inlet and closing the outlet of the other well.

3. In an apparatus of the class described, a concrete structure having two wells each provided at the bottom with an inlet and an outlet distinct from said inlet; a compartment with which said inlets communicate and to which water is admitted from a source of supply; and means disconnected from the float in one well for positively closing its inlet and opening its outlet and simultaneously opening the inlet and closing the outlet in the other well.

4. In an apparatus of the class described, a structure having two wells; a float in each well; means for admitting water under pressure to the bottom of said wells from a source of supply common to both wells; gate actuating levers provided with depending weights in the path of but disconnected from the float in one well and operated by the contact of said weights with said float in its upward movement for preventing further admission of water to said well, and opening an outlet therefrom and simultaneously permitting the admission of water to the other well.

5. In an apparatus of the class described, a concrete structure having two wells each provided at the bottom with an inlet and an outlet distinct from said inlet; a compartment with which said inlets communicate and to which water is admitted from a source of supply; means disconnected from the float in one well for positively closing its inlet and opening its outlet and simultaneously opening the inlet and closing the outlet in the other well; and a gate controlling the admission of water to said compartments.

6. In an apparatus of the class described, a structure having two main wells, each connected by an opening with a smaller well into which the water in the main well is adapted to be discharged; a float in each well; a gate for said opening; means for admitting water under pressure to said main wells from a source of supply common to both main wells; means actuated by the float in each main well for preventing further admission thereto, actuating the gate to uncover the opening to its companion smaller well, closing the gate between the other pair of wells, and admitting the water to the other main well; and means for opening the outlet to each small well when the float therein reaches its upper position.

7. In an apparatus of the class described, a concrete structure having two wells, each having an inlet opening and a discharge opening at the bottom thereof distinct from each other; a gate for each opening; a float in each well; and gate actuating mechanism disconnected from each float but adapted to be positively operated by contact therewith upon reaching the upper end of its well, for opening the gate of its discharge opening and closing its inlet gate, and simultaneously opening the gate of the inlet opening and closing the discharge opening of the other well.

8. In an apparatus of the class described, a concrete structure having two wells, each having an inlet opening at the bottom thereof and another opening at the bottom thereof through which the material is adapted to be discharged; a float in each well; power developing mechanism actuated by the movement of said floats; gates for said openings; gate actuating mechanism for alternately admitting water under pressure to the bottom of said wells from a source of supply intermediate said wells, and discharging said water from each well when the float therein reaches the upper end of its well; and means disconnected from each float and connected with said gate actuating mechanism in the path of each float and adapted to be lifted and operate said gate actuating mechanism, by direct contact with the upper face of said float during its upward movement.

9. In an apparatus of the class described, a concrete structure having two wells; a float in each well; power-developing mechanism actuated by the movement of said floats; a passage between said wells through which water under pressure is adapted to flow to either well through an inlet opening from said passage; a slidable gate for closing the inlet to said passage; and means disconnected from but actuated by contact with said float for alternately admitting water from said passage to the bottom of said wells and discharging said water from each well when the float therein reaches the upper end of said well.

10. In an apparatus of the class described, a concrete structure having two wells; a float in each well; power-developing mechanism actuated by the movement of said floats; a passage between said wells through which water under pressure is adapted to flow to either well through an inlet opening from said passage; a slidable gate for closing the inlet to said passage; and positive means disconnected from but operable by contact with the upward movement of said floats in their upward movement for alternately admitting water from said passage to the bottom of said wells and discharging said water from each well when the float therein reaches the upper end of said well.

11. In an apparatus of the class described, a structure having two pairs of wells, each pair consisting of a main well and a smaller well into which the water of the main well is adapted to be discharged, said pair of wells being separated by inlet and discharge passages; floats in said wells; means for admitting water under pressure from said inlet passage alternately to each main well; means for discharging the water from each main well into its companion smaller well when the float in the main well reaches the upper end thereof; and means for discharging the water in one pair of wells into the outlet passage while water from the inlet passage is being admitted to the other pair of wells.

12. In an apparatus of the class described, a structure having two pairs of wells, each pair consisting of a main well and a smaller well into which the water of the main well is adapted to be discharged, said pair of wells being separated by inlet and discharge passages; floats in said wells; means for admitting water under pressure from said inlet passage alternately to each main well;

means for discharging the water from each main well into its companion smaller well when the float in the main well reaches the upper end thereof; means for discharging the water in one pair of wells into the outlet passage while water from the inlet passage is being admitted to the other pair of wells; power-developing mechanism; and means for actuating said mechanism controlled by the movement of said floats.

13. In an apparatus of the class described, a structure having two pairs of wells, each pair consisting of a main well and a smaller well into which the water of the main well is adapted to be discharged, said pair of wells being separated by inlet and discharge passages; floats in said wells; means for admitting water under pressure from said inlet passage alternately to each main well; means for discharging the water in one pair of wells into the outlet passage while water from the inlet passage is being admitted to the other pair of wells; a rotatable shaft over the main wells; a second shaft over the smaller wells; a driving shaft; driving connections between said rotatable and second shafts and said driving shaft; and means actuated by the movement of said floats for revolving said rotatable and second shafts.

14. In an apparatus of the class described, a structure having two pairs of wells, each pair consisting of a main well and a companion smaller well; floats in said wells; means for discharging water under pressure from each main well to said smaller well when the float in the larger well reaches its upper position; and means controlled by the upward movement of the float in the smaller well for timing the discharge of water from said smaller well.

15. In an apparatus of the class described, a structure having two pairs of wells, each pair consisting of a main well and a smaller companion well connected thereto by a connecting opening; an inlet opening to each main well; a discharge opening from each smaller well; mechanism operable by the float in one main well, when it is in its upper position, for shutting off the admission of water to said well, opening the inlet to the other main well and closing the outlet therefrom, and opening the discharge opening from said main well to its companion smaller well; and mechanism operable by the float in said smaller well for opening the discharge opening therefrom when said float has reached its upper position.

16. In an apparatus of the class described, a structure having two pairs of wells, each pair consisting of a main well and a smaller companion well connected thereto by a connecting opening; an inlet opening to each main well; a discharge opening from each smaller well; mechanism operable by the float in one main well, when it is in its upper position, for shutting off the admission of water to said well, opening the inlet to the other main well and closing the outlet therefrom, closing the outlet of said smaller well, and opening the discharge opening from said main well to its companion smaller well; and mechanism operable by the float in said smaller well for opening the discharge opening therefrom when said float has reached its upper position.

17. In an apparatus of the class described, a structure having a plurality of main wells and a smaller well connected to each main well; floats in said wells; means for admitting water under pressure to said main wells so that the floats therein will always be moving in opposite directions; parallel rotatable shafts above said main wells and smaller wells; means on the floats for rotating the shafts; a driving shaft; and means for transmitting rotary movement from said rotatable shafts to said driving shaft.

18. In an apparatus of the class described, a structure having a plurality of main wells and a smaller well connected to each main well; floats in said wells; means for admitting water under pressure to said main wells so that the floats therein will always be moving in opposite directions; parallel rotatable shafts above said main wells and smaller wells; means on the floats for rotating the shafts; a driving shaft intermediate said parallel shafts; and means for transmitting rotary movement from said rotatable shafts to said driving shaft.

19. In an apparatus of the class described, a structure having two wells therein and a communicating opening through the bottom of the dividing wall; floats in said wells; a pivoted gate adapted to close the opening; rods pivotally connected to said gate on opposite sides of the gate pivot; and means coacting with one of said rods to open the gate when one float is in the upper end of its well; and means coacting with the other rod for closing the gate when said float has reached the bottom of said well.

20. In an apparatus of the class described, a structure having two wells therein and a communicating opening through the bottom of the dividing wall; floats in said wells; a plate set into the dividing wall; a gate adapted to close the opening pivoted to said plate; rods pivotally connected to said gate on opposite sides of the gate pivot; means coacting with one of said rods to open the gate when one float is in the upper end of its well; and means coacting with the other rod for closing the gate when the said float has reached the bottom of said well.

21. In an apparatus of the class described, a structure having two wells therein and a communicating opening through the bottom of the dividing wall; floats in said wells; a pivoted gate adapted to close the opening; rods pivotally connected to said gate on opposite sides of the gate pivot; means coacting with one of said rods to open the gate when one float is in the upper end of its well; means coacting with the other rod for closing the gate when said float has reached the bottom of said well; and means for discharging the water in both wells when the float in the other well has reached its upper position in said well.

22. In an apparatus of the class described, a structure having a plurality of wells therein separated by dividing walls provided with openings in the bottom thereof through which water under pressure is adapted to pass; plates set into said walls with openings therethrough corresponding to the wall openings; a gate pivoted to each plate; two rods pivotally connected to each gate; and means above said structure coacting with said rods for moving said gate in opposite directions about its pivot.

23. In an apparatus of the class described, a structure having a plurality of wells therein separated by dividing walls; provided with openings in the bottom thereof, through which water under pressure is adapted to pass; plates set into said walls with openings therethrough corresponding to the wall openings; a gate pivoted to each plate; two rods pivotally connected to each gate; and float-actuated means above said structure coacting with said rods for moving said gate in opposite directions about its pivot.

Signed by me at 746 Old South Bldg., Boston, Mass., this 31st day of August, 1922.

JOHN A. KNOWLTON.

Witnesses:
 WALTER E. LOMBARD,
 NATHAN C. LOMBARD.